United States Patent [19]
Owen et al.

[11] 3,995,112
[45] Nov. 30, 1976

[54] TELEVISION SYNCHRONIZING PULSE GENERATING SYSTEM

[75] Inventors: David Peter Owen, Newbury; Barry Donald Ruberry Miles, Thatcham, both of England

[73] Assignee: Quantel, Limited, England

[22] Filed: Dec. 19, 1975

[21] Appl. No.: 642,201

[30] Foreign Application Priority Data
Dec. 19, 1974 United Kingdom............... 54882/74

[52] U.S. Cl. .......................................... 178/69.5 G
[51] Int. Cl.² ............................................ H04N 5/06
[58] Field of Search ............................... 178/69.5 G

*Primary Examiner*—Robert L. Richardson
*Attorney, Agent, or Firm*—Dowell & Dowell

[57] ABSTRACT

A generator system for producing advanced mixed synchronizing pulses and comprising an equalizing pulse detector capable of detecting the presence of a first equalizing pulse of a mixed synchronizing pulse received at its input and a broad pulse generator. Delay means are provided for inhibiting the generation of the broad pulses for a preset period after the detection of the first equalizing pulse. The delay period is less than the period between the first equalizing pulse and the first broad pulse received whereby the broad pulses from the generator are producible in advance of the broad pulses received at the generator input. The generated pulses are added to the original mixed sync. pulse train whereby a mixed sync. pulse train is producible at the generator system output in which the original broad pulses and some of the equalizing pulses are replaced by the generated broad pulses.

10 Claims, 4 Drawing Figures

TELEVISION SYNCHRONIZING PULSE GENERATING SYSTEM

BACKGROUND TO THE INVENTION

This invention relates to television synchronizing pulse generating apparatus.

The train of pulses used to synchronise television picture origination equipment and television receiving equipment is commonly known as Mixed Syncs. (U.K.) or Composite Syncs. (U.S.A.). This pulse train consists of three types of pulses as follows:-
  a. Line Syncs. to synchronise the horizontal scanning circuits.
  b. Equalising pulses to ensure correct interlacing of odd and even fields.
  c. Broad Pulses to synchronise the vertical scanning circuits.

Such pulse trains are produced by known generators, the various pulses in the train being generated in a sequence dependent on the system in which they will be used (e.g. 525 line or 625 line).

It is often desirable to provide an addition to the normal mixed sync. pulses a further set of mixed syncs. which lead (in time) the normally used mixed syncs. by a period of a few lines. An existing solution to this problem is to regenerate the complete mixed sync. train via phase locked loop oscillators for example which can provide the advanced timing information. This is an expensive solution since it calls for a repetition of the major part of the equipment known generally as a television sync. pulse generator which is used to generate the normal mixed sync. pulses.

In some applications it is not necessary for the additional pulse train to be identical to the normal mixed sync. pulse train, e.g. when the additional advanced pulses are used merely as a synchronising signal for a video tape recorder. In such applications a simplified generator system could be used.

OBJECTS OF THE INVENTION

Objects of the invention are to provide a simplified advanced sync. generator in which:-
  1. The output pulse train contains both horizontal (line) and vertical (broad) synchronising pulses which are identical to horizontal and vertical synchronising pulses in the normal mixed syncs.
  2. The generator operates with normal mixed syncs. as its only signal input.
  3. Additional broad pulses are provided preferably between ½ and 2½ lines in advance of the vertical synchronising component (broad pulses), said advance being preferably adjustable in increments of ½ line periods.

SUMMARY OF THE INVENTION

According to the invention there is provided an advanced mixed synchronising pulse generator system comprising equalizing pulse detector means capable of detecting the presence of a first equalizing pulse of a mixed synchronising pulse receiving at its input; broad pulse generating means; delay means for inhibiting the generation of said broad pulses for a preset period after the detection of said first equalizing pulse, said delay period being less than the period between the first equalizing pulse and the first broad pulse receiving whereby the broad pulses from said generator are producible in advance of the broad pulses received at the generator input; and wherein means are provided for adding the generated pulses to the original mixed sync. pulse train whereby a mixed sync. pulse train is producible at the generator system output in which the original broad pulses and some of the equalizing pulses are replaced by the generated broad pulses.

BRIEF DESCRIPTION OF THE DRAWINGS

The invention will now be described by way of example with reference to the accompanying drawings, in which:-

DESCRIPTION OF PREFERRED EMBODIMENTS

Figure 1:
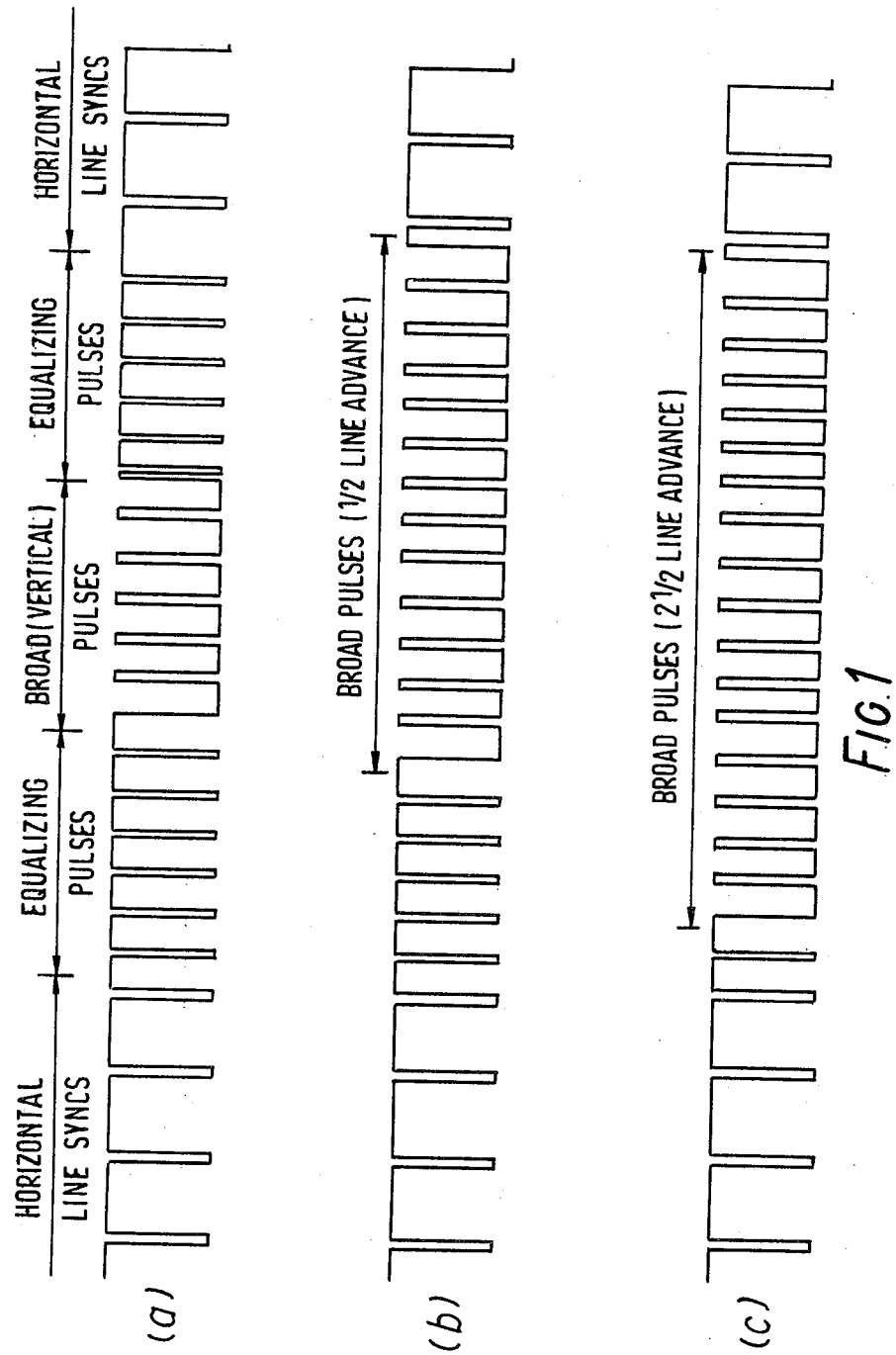
FIG. 1 shows the output pulse waveforms produced by the generator according to the invention compared with the pulses received from the normal mixed sync. generator.

The normal mixed sync pulse train of FIG. 1 (a) is part of a typical train produced by a known generator for use in a particular television system. This train is in fact that produced for field two of the 525 line NTSC system.

It is seen that after the first block of horizontal line sync. pulses and before the next block of line sync. pulses there are six equalizing pulses followed by six vertical (broad) pulses, followed by a further six equalizing pulses. The horizontal line sync. pulses have a width of 4.7$\mu$s and repeat at line period (63.5$\mu$s). Equalizing pulses have a width of 2.35$\mu$s and repeat at twice line period. Broad pulses have a width of 27.15$\mu$s and a period of 4.7$\mu$s between pulses so that these broad pulses repeat at twice line frequency also.

Figure 2:
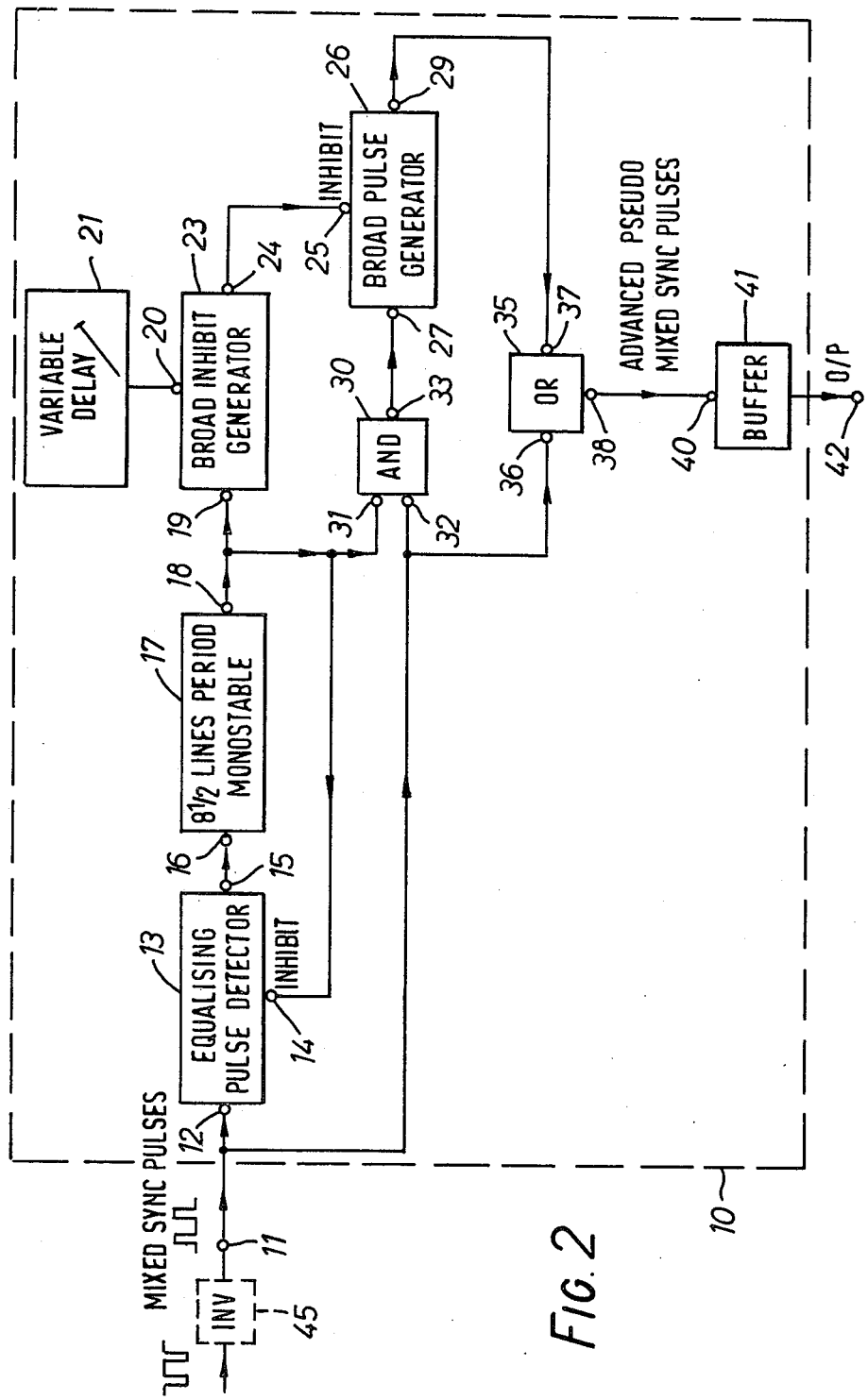
FIG. 2 shows a block diagram of an embodiment of the advanced mixed sync. pulse generator according to the invention.

In FIG. 2, a generator 10 for producing the advanced pseudo mixed sync. pulse train has an input 11 for receiving the mixed sync. pulse train. The input 11 is connected to an input 12 of an equalising pulse detector 13.

An output 15 from detector 13 is connected to input 16 of monostable 17, which has its output 18 connected respectively to input 19 of inhibit monostable 23, to inhibit input 14 of detector 13 and to one input 31 of AND gate 30. The other input 32 of gate 30 is connected to input 11. The monostable 23 has an input 20 connected to delay 21, the delay being presettable between ½ line and 2½ lines delay. Output 24 of monostable 23 is connected to inhibit terminal 25 of broad pulse generator 26. Output 33 of AND gate 30 is connected to input 27 of generator 26 and generator output 29 is connected to one input 37 of OR gate 35. A second input 36 of gate 35 is connected to the input 32 of gate 30. which receives the incoming pulse train. Output 38 of OR gate 35 is connected to input 40 of buffer 41. Output 42 of generator 10 is taken from the buffer output.

The normal mixed sync. pulse train received at input 11 has positive going pulses. If the pulse train of FIG. 1 (a) is used (i.e. this has negative going pulses) then it is necessary to connect this train to input 11 via an inverter 45.

The equalising pulse detector 13 "looks for" pulses that are less than 4.7$\mu$s, i.e. equalising pulses. When the first equalising pulse is recognised monostable 17 is triggered which produces an inhibit for detector 13. Monostable 17 has in this example a delay equivalent to 8½ lines, and thus detector 13 is unable to operate on the remaining equalising pulses.

The undelayed edge of the 8½ line monostable output triggers the further monostable 23 which prevents the broad pulse generator 26 from operating for a period set by the delay 21. This delay 21 allows adjustment of the amount of broad pulse timing advance. when the generator inhibit monostable 28 times out, the broad pulse generator 26 is allowed to trigger on the leading edge of the mixed sync. input pulses received via AND gate 30 until 8½ lines period monostable 17 times out. These new broad pulses are added to the input mixed sync. train in the OR gate 35 to form the "Advanced Pseudo Mixed Syncs".

The OR gate output is made available at the output 42 via buffer 41.

Thus it can be seen from FIG. 1 (b) that the broad pulses are advanced by ½ a line and these broad pulses continue up to the first horizontal line sync. of the next block (i.e. the remaining equalising pulses are replaced by broad pulses).

The pulse train of FIG. 1 (c) shows a 2½ line advance of the broad pulses and these similarly cease before the start of the next line sync. pulse received.

Figure 3:
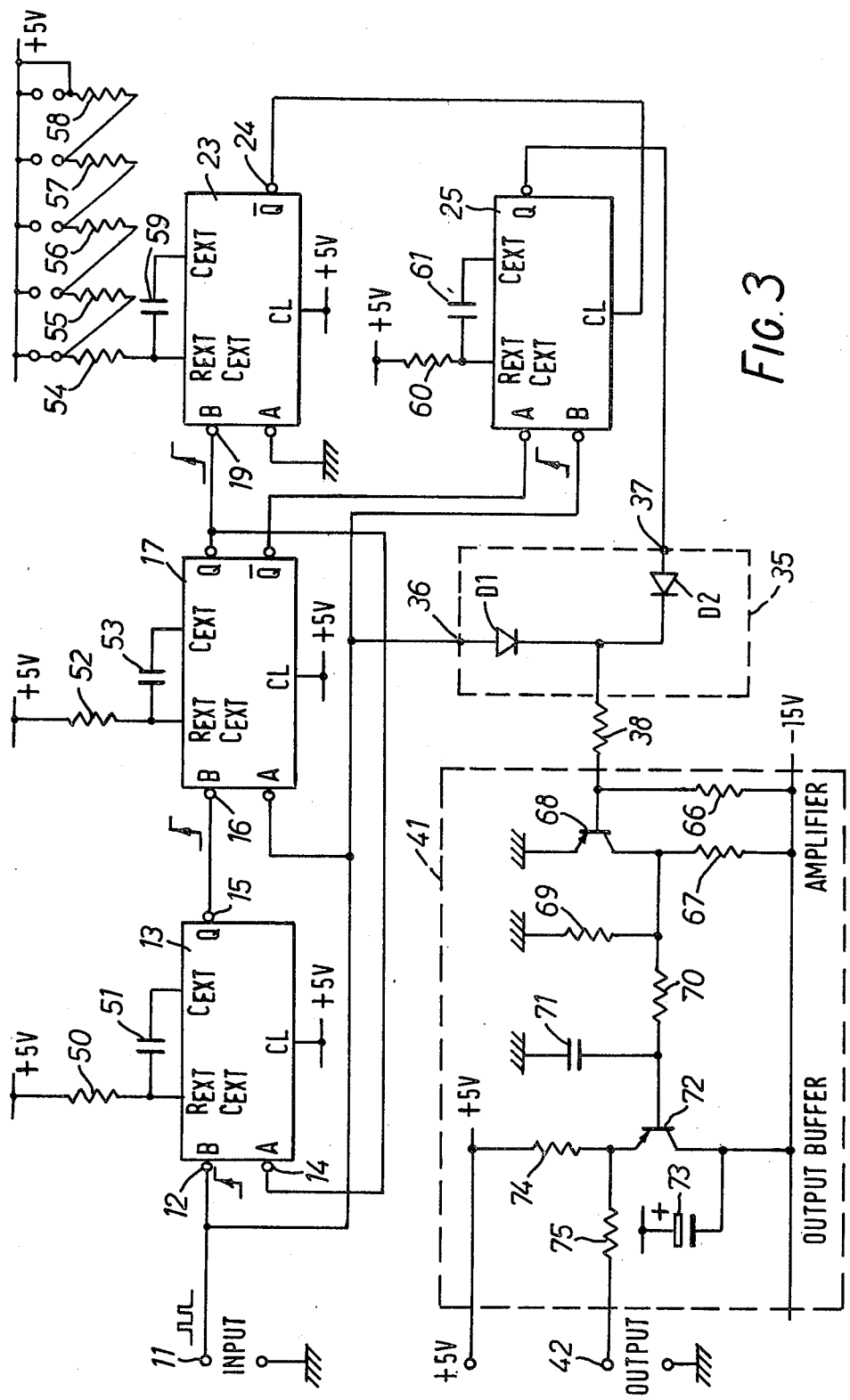
FIG. 3 shows a circuit arrangement which could be used to produce the generator of FIG. 2.

The circuit is realised for example by the arrangement of FIG. 3 using 74 series TTL monostables, in particular the 74123 dual monostable package. This package type contains a pair of edge triggered monostables which have two input ports marked input A and input B. The monostable will trigger from a positive going edge on B if input A is at a logic low and will also fire off a negative going edge on input A if input B is at a logic high. The 74123 monostables also have a clear input which prevents the monostable from being triggered by pulses on either the A or the B input as long as the clear input is maintained at a logic low level.

The equalising pulse detector 13 and 8½ lines period monostable 17 are made up from one dual package and operate as follows:

Positive loing logic level mixed sync. pulses are applied to the B input of detector 13 and the A input of monostable 17. If monostable 17 is in the quiescent condition, then input A of detector 13 will be at a logic low level thus allowing detector 13 to trigger off the positive going edges of inverted mixed syncs. at input B. The time constant of detector 13 is arranged to produce pulses which are longer than equalising pulses but shorter than line sync. pulses, that is a period of about $3.5\mu$ secs. These positive going pulses are applied to the B input (positive edge triggered) of monostable 17.

The action of monostable 17 during the period when line syncs. are present at the input will now be considered. Line syncs. have a period of $4.7\mu$ secs. (i.e. are longer than the pulse from output Q of detector 13) which means that when the negative edge of an input sync. pulse occurs at the input A of monostable 17, the pulse at the B input has already relaxed to a logic 0 level. Monostable 17 will therefore not trigger under these conditions and the Q output of monostable 17 will remain at a logic low level thus allowing detector 13 to continue triggering on further line sync. pulses.

In the case when equalising pulses ($2.35\mu$ secs.) are received at input 11 because the period of equalising pulses is shorter than the time constant of detector 13 it can be seen that when the negative edge of an equalising pulse occurs the output of detector 13 is still high. This allows monostable 17 to trigger for a period of 8½ lines. The 8½ line period positive going pulse at the Q output of monostable 17 is applied to the A input of detector 13 to prevent this from triggering on further equalising pulse and broad pulse edges during this 8½ line time. The equalising pulse detector 13 can therefore be seen to be dependent on its action together with the pulse action on inputs A and B of monostable 17.

At the $\overline{Q}$ output of monostable 17 there is a negative going pulse with a period of 8½ lines and leading edge almost eoincident of the first equalising pulse. This is applied to the A input of one half of a further dual monostable which forms the broad pulse generator 25 which allows this monostable forming generator 25 to trigger off from the leading edges of the mixed sync. pulse applied to its input B. However, because the time at which the new broad pulses are added is to be variable in increments of half a line, generator 25 is prevented from operating until required by applying a logic low level at the clear input from the $\overline{Q}$ output of inhibit monostable 23 which is formed from the other half of the dual monostable forming the generator 25.

Monostable 23 is triggered by the leading edge of the Q output of monostable 17 which is slightly delayed from the trailing edge of the first equalising pulse.

Generator 25 will then trigger on the first positive going edge applied to input B (mixed syncs.) after the clear input has gone to logic high level. The adjustment of the time constant of monostable 23 is arranged such that this monostable times out in any one of the intervals between the first and sixth equalising pulse received. This allows generator 25 to begin triggering on the second to sixth equalising pulse to provide from 2½ to ½ lines advance of broad pulses. The function of AND gate 30 of FIG. 2 is provided by the A and B inputs of generator 25 in dependence on the Q output of monostable 17.

The positive going broad pulses generated are added to the positive going input mixed syncs. at the junction of D1 and D2. These diodes form the OR gate 35 of FIG. 2, that is if either the anode of D1 or D2 is high, then the junction of the diodes will also be at a logical high level.

The resistor and capacitor combinations 50 and 51; 52 and 53, 54, 55, 56 or 58 and 59; 60 and 61 are chosen to provide the recurring time delay in a manner well known for use with integrated circuit packages.

The output buffer and pulse amplifier 41 comprises transistor 68 with resistors 65, 67, 69 and 70 and capacitor 71 to which a further transistor 72 is connected and having additional resistors 74, 75 and capacitor 73.

This amplifier 41 converts the TTL logic level pulses to the levels normally used for pulses distributed within television studio areas. These pulses are negative going, 4 volts peak to peak into 75 ohms.

Whilst the waveforms described in FIG. 1 relate to Field No. 2 of the 525 line NTSC system the pulse chain for Field No. 1 is similar except that there is a one line space between the last line sync. and the first equalising pulse and subsequently only ½ line space between the last equalising pulse (after the broad pulses) and the first line sync. pulse to provide the required interlacing. Thus, Field No. 2 is accommodated by the generator 10 in a similar manner to that described above.

If the generator is to be used with the 625 line system which has a pulse train which includes 5 equalising pulses followed by 5 broad pulses followed by another 5 equalising pulses, then it is only necessary for the monostable 17 to have a delay period of 7 lines to allow the last of the equalising pulses to pass before resetting of the pulse detector 13. This change of period of monostable 17 can be easily effected by suitable selection of capacitor 53 and resistor 52.

Figure 4:
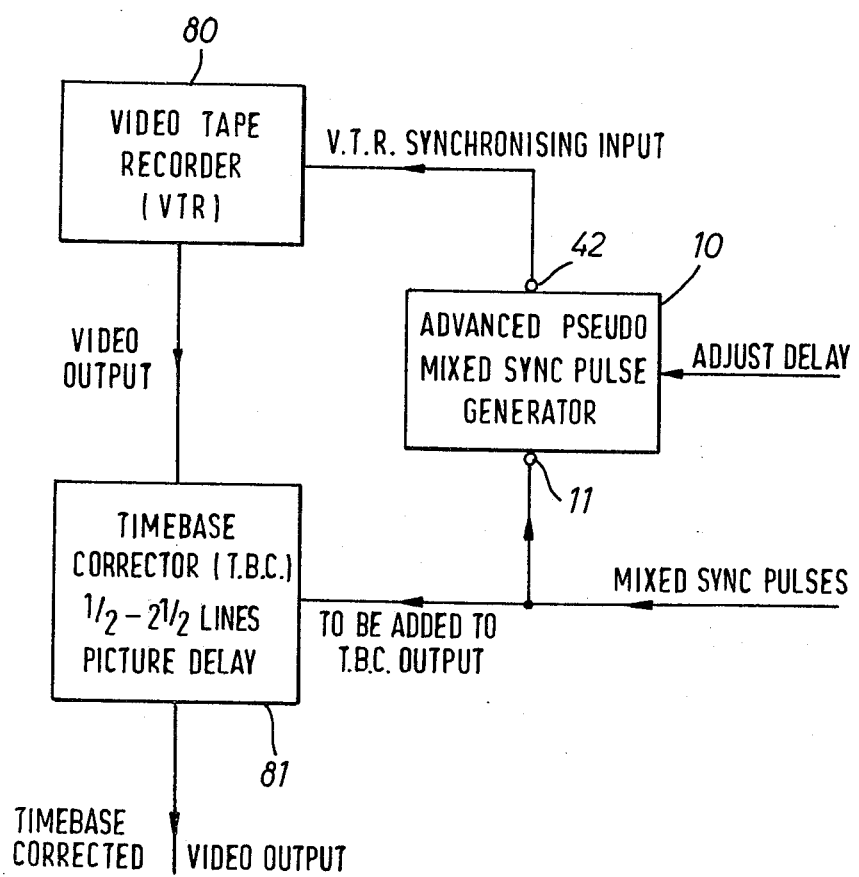
FIG. 4 shows one application in which the generator of the present invention can be used.

One application for generator 10 is shown in FIG. 4 in which the mixed sync. pulses are applied to input 11 of the generator 10 as well as to a video time base corrector 81. The output 42 of the generator is fed to the synchronizing input of video tape recorder 80, so that the VTR output is provided in advance of its normal requirement so that after being corrected in the corrector 81, which will cause delay to the signal the video output will be available at the correct moment in time.

We claim:-

1. An advanced mixed synchronizing pulse generator system comprising:
   a. equalising pulse detector means capable of detecting the presence of a first equalising pulse of a mixed synchronizing pulse train received at its input;
   b. broad pulse generating means;
   c. delay means for inhibiting the generation of said broad pulses for a preset period after the detection of said first equalising pulse, said delay period being less than the period between the first equalising pulse and the first broad pulse received whereby the broad pulses from said generator are producible in advance of the broad pulses received at the generator input; and wherein
   d. means are provided for adding the generated pulses to the original mixed sync. pulse train whereby a mixed sync. pulse train is producible at the generator system output in which the original broad pulses and some of the equalising pulses are replaced by the generated broad pulses.

2. A generator system according to claim 1, wherein inhibit means are provided connected to said equalising pulse detector to produce an inhibit signal after the detection of the first equalising pulse by said detector, said inhibit signal being of a time period sufficient to inhibit said detector from detecting the remaining equalising pulses in said incoming mixed sync. pulse train.

3. A generator system according to claim 2, wherein said inhibit means are connected also to said broad pulse generator via gating means to prevent the generation of further pulses from the broad pulse generator after the last equalising pulse has been received and before the receipt of the next horizontal line sync. pulse.

4. A generator system according to claim 1, wherein said delay means has a delay period presettable betwen 1⅞ and 2½ line periods.

5. A generator system according to claim 4, wherein said delay means comprises a monostable circuit with a delay period presettable by means of external resistors.

6. A generator system according to claim 1, wherein said pulse detector comprises a monostable circuit having a timing period greater than that of the incoming equalising pulses and less than the time period of the line sync. pulses.

7. A generator system according to claim 1, wherein said broad pulse generator comprises a monostable circuit having a time period equal to that of the incoming broad pulses.

8. A generator system according to claim 1, wherein said means for adding the generated pulses comprises an OR gate.

9. A generator system according to claim 2, wherein said inhibit means comprises a monostable circuit having a timing period of at least 7 line periods.

10. A generator system according to claim 2, wherein said inhibit means comprises a monostable circuit having a timing period of at least 8½ line periods.

* * * * *